(No Model.) 2 Sheets—Sheet 1.
R. M. HUNTER.
ELECTRICAL MEASURING INSTRUMENT.
No. 501,589. Patented July 18, 1893.
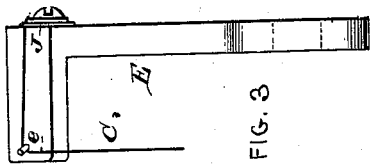
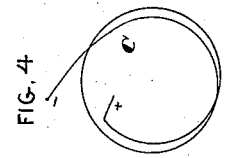
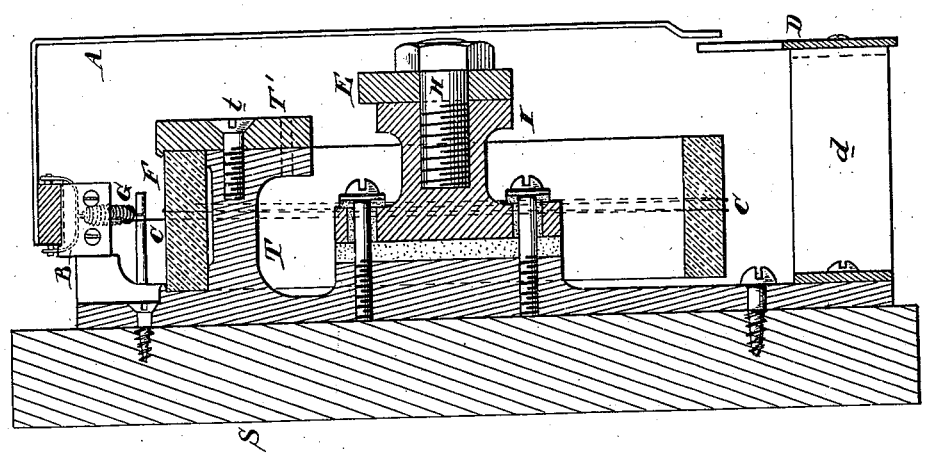
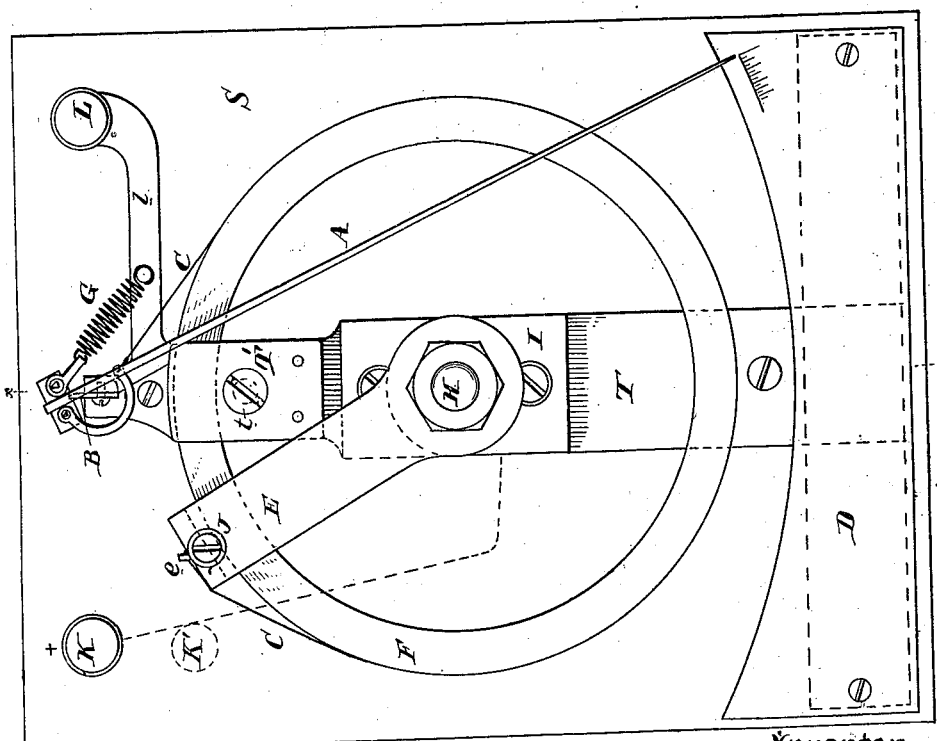
Attest
Inventor (No Model.) 2 Sheets—Sheet 2
R. M. HUNTER.
ELECTRICAL MEASURING INSTRUMENT.
No. 501,589. Patented July 18, 1893.
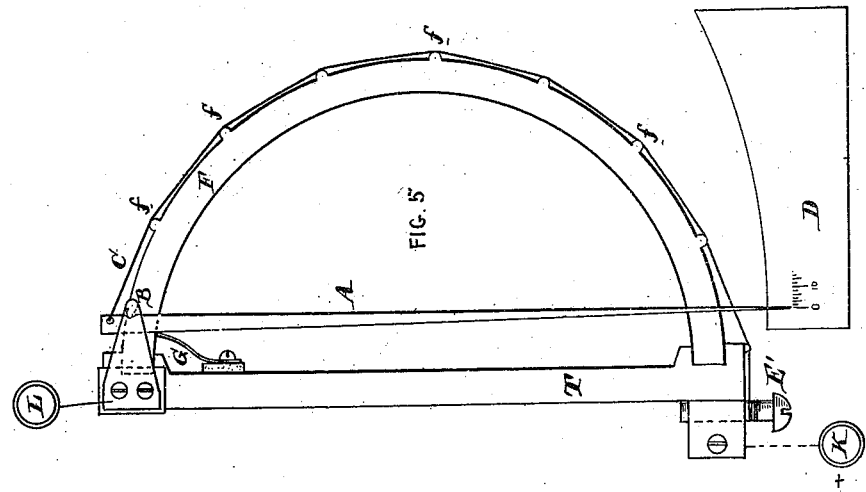
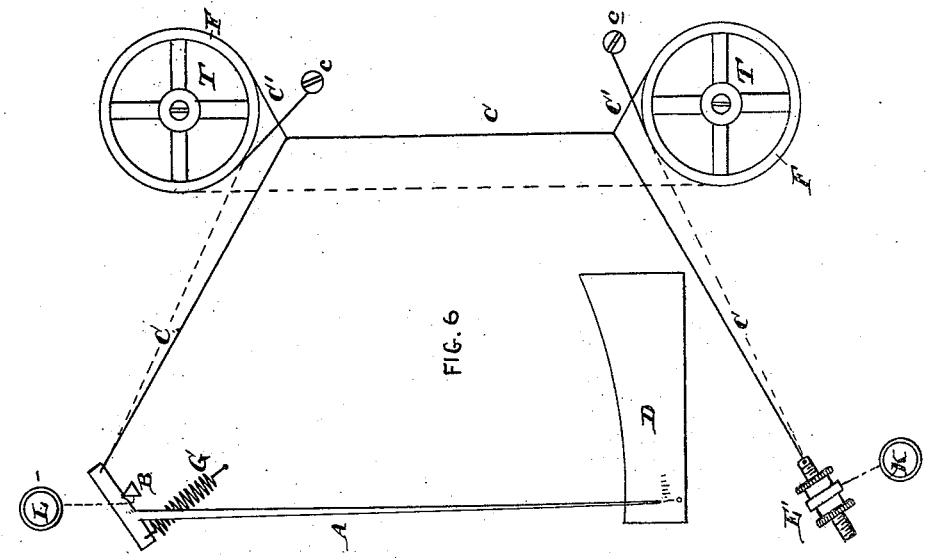
Attest
Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRICAL MEASURING-INSTRUMENT.

SPECIFICATION forming part of Letters Patent No. 501,589, dated July 18, 1893.

Application filed February 10, 1893. Serial No. 461,782. (No model.)

*To all whom it may concern:*

Be it known that I, RUDOLPH M. HUNTER, of the city and county of Philadelphia and State of Pennsylvania, have invented an Improvement in Measuring-Instruments, of which the following is a specification.

My invention has reference to measuring instruments for electric current, and consists of certain improvements which are fully set forth in the following specification and shown in the accompanying drawings which form a part thereof.

This application, Case No. 244, comprehends that class of measuring instruments especially adapted to measure the potential in volts or current in ampères, and which instruments are commonly called volt meters or ammeters.

In carrying out my invention I employ an expansion wire of suitable material and cause the same to act upon a movable pointer or indicator preferably made to traverse a scale or dial. The expansion wire is supported in a curved or polygonal shape by means of suitably curved or cylindrical expansion supports with which it is combined in such a manner that the expansion of the support compensates for the expansion of the wire for all variations in atmospheric changes of temperature during the normal working of the instrument, thereby making itself compensating and accurate in its operation.

My invention will be better understood by reference to the accompanying drawings, in which—

Figure 1 is a front elevation of the preferred form of my improved electric measuring instrument. Fig. 2 is a vertical section of same on line *x—x*. Fig. 3 is an elevation of the adjusting arm for holding one end of the expansion wire. Fig. 4 is a perspective view illustrating the coils of the expansion wire; and Figs. 5 and 6 are elevations of modifications of my invention.

A is the pointer and is pivoted at B upon which is a knife edge which acts as a fulcrum. A spring G operates upon the pointer A to make it traverse a scale upon a dial plate D.

C is the expansion wire and is connected with the pointer in a manner to cause an opposing force to the action of the spring, and to normally hold the pointer at zero.

The expansion wire C is wound about a cylindrical support F, preferably of glass, porcelain or other refractory and insulating material. The distant end of the said expansion wire C is firmly secured to an arm E. The expansion wire in passing about the cylinder F has its coils kept separated in cases where it is required to pass more than once around the said cylinder.

S is the base board of the meter and has secured to it a supporting frame T of metal upon which is hung or clamped the glass cylinder F, as clearly illustrated in Figs. 1 and 2, the said glass being clamped in position upon said frame by a clamping piece T' and screw *t*. In this manner the cylinder is held at one place with full opportunity of expansion throughout its entire circumference. Furthermore, by the construction full circulation of air may be had about the cylinder to dissipate the heat adjacent to it and thus prevent over heating. Arranged at the center of the glass cylinder and secured to the frame T, and at the same time insulated from it is a post I upon which is adjustably clamped by a screw H the radiating adjusting arm E, the free end of which projects down over the cylindrical surface of the glass F and receives the end of the expansion wire C. As shown, the expansion wire is drawn about an oblique pin *e* upon the end of the adjusting arm E and is then secured to the arm by a clamping screw J as is clearly illustrated in Figs. 1 and 3.

K is the positive binding post and is connected with the central post I by a circuit as indicated by dotted lines in Fig. 1.

L is the negative binding post and is directly connected by a plate *l* with the frame T. If desired, resistances may be employed in the usual manner in instruments of this class between the positive binding post and the post I corresponding to the dotted line at K', or such resistances may be entirely independent of the measuring instrument. If the current is passed in at the post K it is caused to traverse the expansion wire C, and this in expanding, permits the spring G to come into play and move the pointer or indicator A over the scale B thereby indicating the current. The coefficients of expansion of the wire C and its insulating support F have such relations that by properly proportioning the parts, the normal variation in the length of the wire C for changes in atmospheric temperature are compensated for by the increasing circumference of the cylindrical support F due to its increase in diameter. The instrument is thus self compensating. In view of the fact that the fine expansion wire C is made to lie directly against the cylinder surface F, the heat which is due to the passage of the current in the wire will give a small warmth to the cylinder of glass. By making the glass thick and thus giving a large mass, the small amount of heat does not materially modify or change the cylinder as such heat is dissipated readily and but a small warmth is retained by the glass.

In practice I have found that while the instrument is absolutely compensating, the first passage of the current through it when cold causes the needle to move over a scale to a distance slightly greater than that which would be normally indicated after the instrument has been in operation for a minute.

The instrument in commercial manufacture would have its scale marked after the current has been passing through it for say a few minutes and the proper uniform temperature has been given to the glass support. This peculiarity would not permit the instrument shown in Figs. 1 and 2 to be used for laboratory work where indications would have to be taken at intervals and where sometimes they would be instantaneous and at other times taken after the current has been traversing the indicator for a period. It is, however, excellently adapted for general commercial use, such as in electric lighting and electric railroads at the central station plants, or in all cases of testing where a continuous series of observations are made for variations in the current. It is particularly adapted to those stations in commercial practice where a constant potential or a constant current is required to be maintained.

The expansion wire E may be of any suitable material such as German silver, bronze, platinum or even steel. By the adjustability of the arm E the instrument would be readily adjusted to vary the length of the expansion wire and thus adjust it so as to be perfectly compensating for different kinds of wire.

In the construction shown in Fig. 5 the support F of glass or vitreous material is shown as semi-circular and provided with a series of projections $f$ extending outwardly over its surface and over which the expansion wire C is stretched so as to give it more of a polygonal condition.

The semi-circular support F is secured to the base frame T of metal which carries the insulated pivot B connected with one terminal L of the instrument, and also the adjusting screw E' which connects with the other terminal K of the instrument. One end of the wire C is connected with the pointer A so as to oppose the action of the spring G which tends to move the pointer over a scale D, and the other end of the wire is connected with the adjusting screw E'. In this construction I have in effect half of the cylinder and expansion wire shown in Figs. 1 and 2. As the wire C does not directly touch the surface of the support F throughout its entire length, it is evident that the heat of the wire will not be easily transmitted to the said support. In this construction it is also evident that the support F might be made of metal and the projection $f$ formed of insulating material arranged between the wire and the said support F.

In the construction shown in Fig. 6 I have still another modification of the invention in which the expansion wire C is formed with only three bends, and in place of passing directly about the cylinders F the said wires may be connected to tension wires C' which are wrapped about the cylinders F and at the free end connected with adjusting screws $c$. The cylinders F are secured to the supports T of any suitable construction. One end of the expansion wire C operates the pointer A against the action of the spring G, and the other end is connected with the adjusting screw devices E'. The current traverses the wire C from the binding post K to binding post L and does not pass through the wires C' about the cylinders F. The expansion in the wire C due to normal variations in temperature is accurately compensated for by the corresponding expansion in the cylinders F and the taking up of the wires C'. This construction combines an expansion wire having portions of its length arranged out of a straight line with a curved compensating and supporting structure adapted to hold the expansion wire in position. There may be any number of the curved compensating parts employed in carrying out my invention.

When the current is passed through the wire C it expands, and the spring G oscillates the pointer A upon its fulcrum B and causes its free end to traverse a scale D.

In place of connecting the wire C with the cylinder F by means of independent wires C', the wire C may be wrapped about the cylinders F, F as indicated in dotted lines in Fig. 6. In this case the expansion of the cylinders will directly operate upon the expansion wire to compensate for difference in its length. It is evident that if desired, but a single one of the expansion cylinders F need be employed in the construction shown in Fig. 6 but in that event where the wire passes about the cylinder, we would have the substance of what is shown in Fig. 1. In a construction such as illustrated in Fig. 6 by the solid lines and where the current is not required to traverse the wire surrounding the cylinders it is quite evident that the cylinders F might be of metal or other material not insulating in character.

I do not confine myself to the details of construction which are shown in the various drawings though I have found these constructions excellent in practice, as my invention comprehends a measuring instrument in which the expansion wire has its variations in length due to normal changes of temperature of the atmosphere compensated for by a cylindrical or a curved surface over which a wire passes which directly or indirectly connects with or forms part of the expansion system of measuring instruments.

What I claim as new, and desire to secure by Letters Patent, is—

1. In a measuring instrument for electric currents, the combination of a pointer, an expansion wire connected with the pointer to move it, a curved surface acting as a support about which the expansion wire is passed, and terminals electrically connected with the expansion wire at a widely separated distance apart.

2. In a measuring instrument for electric currents, the combination of a pointer, an expansion wire connected with the pointer to move it, a curved surface acting as a support about which the expansion wire is passed, an adjustable support for one end of the wire, and terminals electrically connected with the expansion wire at a widely separated distance apart.

3. In a measuring instrument for electric currents, the combination of a pointer, an expansion wire connected with the pointer to move it, a curved surface acting as a support about which the expansion wire is passed, a dial over which the pointer moves, a spring to move the pointer over the dial, and terminals electrically connected with the expansion wire at a widely separated distance apart.

4. In a measuring instrument for electric currents, the combination of a cylinder or curved support of insulating material, a pivoted pointer, an expansion wire to control the movements of the pointer supported upon the surface of the cylinder or curved support.

5. In a measuring instrument for electric currents, the combination of a cylinder or curved support of insulating material, a pivoted pointer, an expansion wire to control the movements of the pointer supported upon the surface of the cylinder or curved support, and an adjustable support for the end of the wire.

6. In a measuring instrument for electric currents, the combination of a cylinder or curved support of insulating material, a pivoted pointer, an expansion wire to control the movements of the pointer supported upon the surface of the cylinder or curved support, and an adjustable support for the end of the wire movable about an axis substantially concentric with the center of the curvature of the cylindrical or curved support.

7. The combination of a pivoted pointer, an expansion wire connected to move the pointer and having portions of its length arranged out of a straight line, terminals connected with the expansion wire at points distantly removed, and a curved compensating support for holding the expansion wire in position.

8. The combination of a pivoted pointer, an expansion wire connected to move the pointer and having portions of its length arranged out of a straight line, terminals connected with the expansion wire at points distantly removed, and a curved compensating support of insulating material for holding the expansion wire in position.

9. The combination of a pivoted pointer, an expansion wire connected to move the pointer and having portions of its length arranged out of a straight line, terminals connected with the expansion wire at points distantly removed, and a curved compensating support of glass or vitreous material for holding the expansion wire in position.

10. The combination of a pivoted pointer, an expansion wire connected to move the pointer and having portions of its length arranged out of a straight line, terminals connected with the expansion wire at points distantly removed, a curved compensating support for holding the expansion wire in position, a scale or dial over which the pointer is moved, and a common support for holding the pivot of the pointer, the curved compensating support and terminals.

11. The combination of a pivoted pointer, an expansion wire adapted to control the movements of the pointer having portions of its length arranged out of a straight line, and terminals connecting with the expansion wire at distantly removed places, and a curved compensating and supporting structure adapted to hold the expansion wire in position.

12. The combination of a pivoted pointer, an expansion wire connected to move the pointer and having portions of its length arranged out of a straight line, terminals connected with the expansion wire at points distantly removed, a curved compensating support for holding the expansion wire in position, and an adjustable device for adjusting the expansion wire in the direction of its length.

In testimony of which invention I have hereunto set my hand.

R. M. HUNTER.

Witnesses:
ERNEST HOWARD HUNTER,
H. L. MOTHERWELL.